(12) United States Patent
Kishan

(10) Patent No.: US 8,365,004 B2
(45) Date of Patent: Jan. 29, 2013

(54) CONFIGURING OF INTELLIGENT ELECTRONIC DEVICE

(75) Inventor: Shanka Gopinath Kishan, Bangalore (IN)

(73) Assignee: ABB Technology AG, Zurich (CH)

( * ) Notice: Subject to any disclaimer, the term of this patent is extended or adjusted under 35 U.S.C. 154(b) by 279 days.

(21) Appl. No.: 12/721,272

(22) Filed: Mar. 10, 2010

(65) Prior Publication Data

US 2010/0205418 A1 Aug. 12, 2010

Related U.S. Application Data

(63) Continuation of application No. PCT/IB2007/053635, filed on Sep. 10, 2007.

(51) Int. Cl.
G06F 13/42 (2006.01)
H03K 19/00 (2006.01)

(52) U.S. Cl. .................................. 713/400; 326/93

(58) Field of Classification Search .................. 713/400, 713/401, 500; 364/513, 200, 274; 326/38, 326/93
See application file for complete search history.

(56) References Cited

U.S. PATENT DOCUMENTS

| | | | | |
|---|---|---|---|---|
| 5,943,243 | A * | 8/1999 | Sherlekar et al. | 716/122 |
| 6,546,534 | B1 * | 4/2003 | Nomura et al. | 716/119 |
| 6,693,452 | B1 * | 2/2004 | Ansari et al. | 326/38 |
| 6,886,092 | B1 * | 4/2005 | Douglass et al. | 712/37 |
| 6,961,919 | B1 * | 11/2005 | Douglass | 716/104 |
| 7,617,470 | B1 * | 11/2009 | Dehon et al. | 716/116 |
| 8,032,852 | B1 * | 10/2011 | Sinclair et al. | 716/116 |
| 2005/0160397 | A1 * | 7/2005 | Szpak et al. | 717/104 |
| 2006/0253821 | A1 * | 11/2006 | Kitahara et al. | 716/6 |
| 2007/0033551 | A1 * | 2/2007 | Greaves et al. | 716/3 |
| 2007/0085518 | A1 * | 4/2007 | Buda | 323/281 |
| 2007/0168161 | A1 | 7/2007 | Vellore et al. | |
| 2009/0199157 | A1 * | 8/2009 | Ishii et al. | 717/105 |

OTHER PUBLICATIONS

International Search Report (PCT/ISA/210) for PCT/IB2007/053635 mailed Aug. 22, 2008.
Written Opinion (PCT/ISA/237) for PCT/IB2007/053635 mailed Aug. 22, 2008.
International Search Report (PCT/ISA/210) for PCT/IB2007/053636 mailed Mar. 10, 2009.
Written Opinion (PCT/ISA/237) for PCT//IB2007/053636 mailed Mar. 10, 2009.
Saman Hadiani, "Design and Implementation of a Function Block Configuration Tool," Apr. 23, 2004, 52 pages.
"DIGSI 4, One Software for all SIPROTEC Protection Relays", Siemens, DIGSI4 Catalog SIP 2006, Jan. 1, 2006, pp. 3-8.
A. Fay et al., "Design and Implementation of Java-Based Industrial Control System Configuration Tool," Emerging Technologies and Factory Automation, 2001, Proceedings, 2001 8th IEEE International Conference on Oct. 15-18, 2001, Piscataway, NJ, USA, IEEE, vol. 2, Oct. 15, 2001, pp. 553-558.

(Continued)

Primary Examiner — Thomas Lee
Assistant Examiner — Phil Nguyen
(74) Attorney, Agent, or Firm — Buchanan Ingersoll & Rooney, P.C.

(57) ABSTRACT

The present disclosure provides a method, apparatus and configuration arrangement for configuring an intelligent electronic device, in which a group of function blocks defining at least a part of a configuration of an intelligent electronic device is provided, connection lines between the function blocks are defined, a fixed function block having a fixed cycle time value is located in the group of function blocks, and setting a configuration setting for a function block that is connected to the fixed function block.

20 Claims, 3 Drawing Sheets

OTHER PUBLICATIONS

B. Duncan et al., "Applications and Advantages for Protection Schemes Using IEC 61850 Standard", Power Systems Conference: Advanced Metering, Protection, Control, Communication, and Distributed Resources, 2006, PS '06, IEEE, Mar. 1, 2006, pp. 63-72.

* cited by examiner

CONFIGURING OF INTELLIGENT ELECTRONIC DEVICE

RELATED APPLICATIONS

This application claims priority as a continuation application under 35 U.S.C. §120 to PCT/IB2007/053635 filed as an International Application on Sep. 10, 2007 designating the U.S., the entire content of which is hereby incorporated by reference in its entirety.

FIELD

The present disclosure relates to configuring of an intelligent electronic device.

BACKGROUND INFORMATION

In a configuring process of intelligent electronic devices, a graphical tool may be used. When using the tool, a user may collect function blocks and connect them such that the necessary inputs and outputs of each function block are connected either to an input/output reference, other function blocks or to external input/output variables.

A number of parameters need to be set for each function block. The setting of parameters is time-consuming and prone to errors. Furthermore, often the user of the configuration tool needs to have in-depth knowledge of the impacts of the parameters for the configuration. Thus, a need exists to provide an improved method and apparatus for reducing the problems associated with making a configuration.

SUMMARY

An exemplary embodiment of the present disclosure provides a configuration arrangement comprising means for providing a group of function blocks defining at least a part of a configuration of an intelligent electronic device, wherein each function block is for executing a function in the intelligent electronic device. The exemplary configuration arrangement also comprises means for defining connection lines between the function blocks, and means for locating, in the group of function blocks, a fixed function block having a fixed cycle time value. In addition, the exemplary method comprises means for defining configuration settings of the configuration by setting a configuration setting for a function block connected to the fixed function block.

An exemplary embodiment provides a method comprising providing a group of function blocks defining at least a part of a configuration of an intelligent electronic device, wherein each function block is for executing a function in the intelligent electronic device. The exemplary method also comprises defining connection lines between the function blocks, and locating, in the group of function blocks, a fixed function block having a fixed cycle time value. In addition, the method comprises defining configuration settings of the configuration by setting a configuration setting for a function block connected to the fixed function block.

BRIEF DESCRIPTION OF THE DRAWINGS

In the following, the present disclosure will be described in greater detail by means of preferred embodiments and with reference to the accompanying drawings, in which.

DETAILED DESCRIPTION

Exemplary embodiments of the present disclosure provide an improved apparatus and method for the configuration of an intelligent electronic device.

An exemplary embodiment provides a method of configuring an intelligent electronic device, comprising providing a group of function blocks defining at least part of a configuration of an intelligent electronic device, wherein each function block is for executing a function in the intelligent electronic device, defining connection lines between the function blocks, locating, in the group of function blocks, a fixed function block having a fixed cycle time value, and defining configuration settings of the configuration by starting from a configuration setting of a function block that is connected to the fixed block.

An exemplary embodiment provides a configuration arrangement for configuring an intelligent electronic device, comprising means for providing a group of function blocks defining at least a part of a configuration of an intelligent electronic device, wherein each function block is for executing a function in the intelligent electronic device, means for defining connection lines between the function blocks, means for locating, in the group of function blocks, a fixed function block having a fixed cycle time value, and means for defining configuration settings of the configuration by setting a configuration setting for a function block that is connected to the fixed function block.

Exemplary embodiments of the present disclosure provide an improvement to a user interface for the configuration of an intelligent electronic device, and avoid at least some of unnecessary compilations of the configurations.

Figure 1:
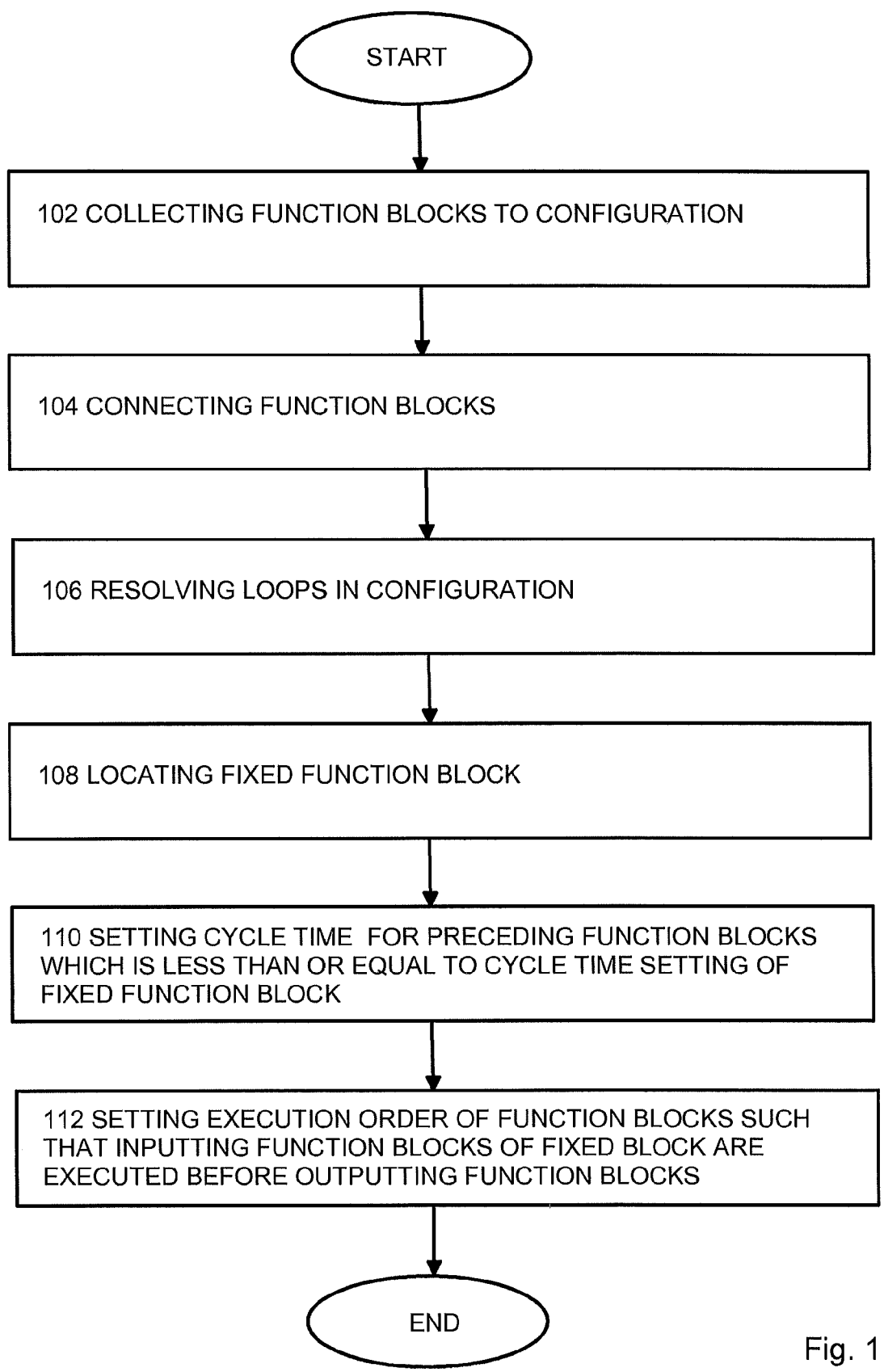
FIG. 1 shows an exemplary embodiment of a method according to the present disclosure.

FIG. 1 shows an exemplary embodiment of a method of configuring an intelligent electronic device, such as a protective relay, for example. In configuring, the operation of the device is defined by using one or more function blocks, each defining a function that may be carried out during the operation of the device. A configuration tool of the present disclosure may be carried out using a graphical/visual language, such as FDB graphical language defined by the IEC 61850 standard, for example. According to an exemplary embodiment, the configuration tool can be executed by a processor of a computer processing device (e.g., CPU), and the configuration tool can be constituted as computer-executable instructions stored on a computer-readable medium and executable by the processor of the computer processing device. In the configuration tool, function blocks that are needed in the device are collected to a visual display of the tool, as illustrated by step 102 in FIG. 1, and complicated networks may be built using the function blocks. A function block may be applied for executing a function, such as a protection, control, monitoring or logic function.

Each function block may include one or more inputs and one or more outputs. As shown in step 104, via these connection interfaces, a function block may be connected to an input or output reference of a function block, other function blocks and/or external variables. Some of the connection interfaces may be obligatory connections, whereas some other connection interfaces may be optional connections. As used herein, an obligatory connection (e.g., interface) means that the particular interface needs to be connected, otherwise a compilation error may be produced. As used herein, optional connections (e.g., interfaces) may or may not be connected. A missing connection in an optional interface produces no compilation error.

In step 106, loops are identified in the configuration. As used herein, a loop is meant to be a part of the configuration where data flow from an output of a function block returns to an input of the same function block. If more than one loop exists in the configuration, priority may be given to a function block to which a physical input of the IED/terminal is connected directly, for example. If none of the loops is connected to the physical input, priority may be given to one over the other randomly.

If in step 106 one or more loops are found, cycle times and execution orders are first determined for the loops. When the loops have been solved, the method may proceed to blocks that do not belong to any loop.

In step 108, a fixed function block is located in the configuration. A fixed block here denotes a function block, which has a fixed cycle time setting. In a first exemplary embodiment, the cycle time value has been preset (e.g., preset in a factory) and cannot be changed by the configuration tool that is used by the user. In another exemplary embodiment, a user using the configuration tool may define that a cycle time setting of a function block is fixed. When the user has defined that a cycle time setting of a function block is fixed, then this function block will be treated as a fixed function block.

According to an exemplary embodiment, the cycle time defines the frequency at which a function block is to be executed. The properties of the function blocks may be stored in a database. A new database file may be opened and continuously/occasionally updated for a configuration, and each function block may constitute a record in the file. The records may have a field indicating whether the cycle time value is fixed or not, and in step 106 a search may be performed to this field. The record of a function block may also have a field for storing one or more cycle time values. If the cycle time value is fixed, as is the case with fixed blocks, the field including the possible values for the cycle time may include only one value that is the fixed value. However, for non-fixed blocks, the cycle time indication may show that the cycle time is not fixed, and the values of the cycle time may include a group of values from which group one value may be chosen to become the cycle time value for the block.

In step 110, the cycle time value of the fixed block is read, and if there are function blocks preceding the fixed block, the cycle time value of the fixed block is set for these blocks. The preceding block here means a function block, which has an output connected to an input of the fixed block. However, according to an exemplary embodiment, a check is performed as to whether the cycle time value of the fixed block is in a group of cycle time values allowable to the block. For example, if a fixed block has a cycle time value of 5 ms, and a preceding block has a set of allowable cycle time values of [3 ms; 5 ms; 7 ms], the value 5 ms is chosen for the preceding block. However, if the fixed block in the above example has a cycle time value of 4 ms, the next smaller value 3 ms may be chosen for the preceding block. If the fixed block is within a loop, all the blocks are assigned a cycle time value, which is equal to or smaller than the cycle time value of the fixed block.

The fixed blocks are the starting point for the algorithm of the configuration tool, and the method proceeds correspondingly to the rest of the function blocks of the configuration.

Although it has been presented above that the loops are processed before processing the fixed function blocks, the order may also be different. For example, if at least one loop exists in the configuration but none of these includes fixed function blocks, the processing of the cycle time determination may start from the fixed function blocks.

The logic explained above is applied to all further preceding blocks of the preceding block of the fixed block. If there is a chain of function blocks preceding a fixed function block, a cycle time value smaller than or equal to the cycle time value of the fixed block is set to all these preceding blocks until another fixed block or a physical input of the device is met. Furthermore, if the outputs of the preceding block are connected to more than one block, a cycle time assigned is the minimum of the succeeding blocks within the constraint of available cycle time.

If more than one fixed block is present in the configuration, it is checked if some of the fixed blocks are connected directly/indirectly, i.e. if one is in the data flow path of the other. If the fixed blocks are not connected, they may be handled separately. If the fixed blocks are connected, the algorithm may start from the fixed block to which the other fixed blocks are feeding.

For the succeeding blocks of the fixed block from which the algorithm started, the method tries to assign the same cycle time as that of the fixed block, taking into consideration the constraint of the allowable cycle time values and the maximum number of instances.

In an embodiment, a CPU (Central Processing Unit) load can also be considered when assigning cycle time to the blocks. In this embodiment, blocks are assigned as great a cycle time as possible taking into account the other limitations presented above in conjunction with the other embodiments in order to minimize the CPU load.

In step 112, an execution order for the configuration is generated. The basic principle in defining the execution order is that a function block closest to a physical input of the device is located, and the smallest execution number is allocated for this block meaning that this block is to be executed first. The execution order assignment may then proceed according to a top-to-bottom or a left-to-right principle, for example.

The execution order may be calculated after the calculation of the cycle time. For example, the execution order of the blocks is determined within a same cycle time. In this algorithm, the calculated execution order is unique for the entire configuration. Execution orders can have a gap there between and they need not be continuous. The calculation of execution order may entirely depend entirely on the data flow in the configuration. The calculation may start from the physical input of the configuration and start assigning the execution order for the blocks based on the connections. A topology sort is used to sort the function blocks from the input of the configuration to the output on the basis of the data flow (connection) information. Once sorted, the execution order is assigned in increasing order, starting from the block, which comes first after sorting.

In an exemplary embodiment, the calculation of the execution order and the cycle time may be carried out for a part of a full configuration. In another exemplary embodiment, the cycle times and execution orders may be determined for a whole configuration.

After the user has completed the configuration, the configuration may be compiled. If compilation errors occur, the errors may be shown (e.g., displayed) to the user for appropriate correction thereof. When the compilation no longer produces errors, the configuration may be uploaded to an IED.

The entire operation of calculating cycle times and execution orders may be carried out on in memory objects representing the function blocks. Once the configuration is saved, then memory objects may be saved in an SQL database. During calculation, each memory block representation has information about its immediate preceding blocks and immediate succeeding blocks to traverse in the configuration.

Figure 2:
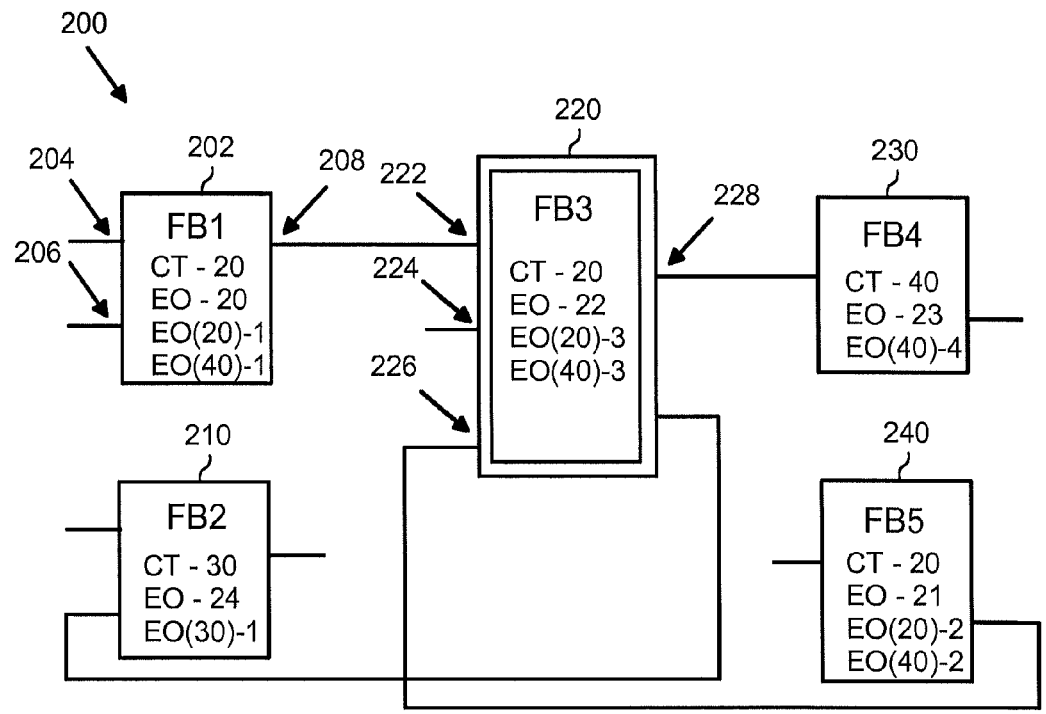
FIG. 2 shows an exemplary embodiment of a configuration according to the present disclosure.

FIG. 2 shows an exemplary embodiment of a visual representation of an intelligent electronic device. For the sake of clarity, the figure shows a portion of the function blocks and the configuration of an intelligent electronic device.

FIG. 2 shows five function blocks FB1 to FB5. Each function block has one or more inputs and one or more outputs. The inputs are located in the graphical representation on the left side of each function block and the outputs are on the right side of the function blocks. In the case of function block FB1 202, the block has two inputs 204 and 206 and one output 208. Some of the inputs may be obligatory, which means that they have to be connected in order for a compilation of the configuration to be successful. Some of the interfaces may be optional. For example, for block FB3 220, inputs 222 and 226 may be obligatory, whereas an input 224 may be optional. As shown in FIG. 2, an output of a block may be connected to an input of another block, e.g. as the output 208 of block 202 is connected to an input 222 of block 220.

The configuration may also include feedback loops. An example of such a feedback loop is an output of function block 220, which is connected to an input of function block 210. Another example of a feedback loop where the connecting line runs from right to left is when an output of FB5 240 is connected to an input of FB3 220.

Function block 220 has a double frame in FIG. 2, which illustrates that the block is a fixed function block. A fixed function block may be a critical function in the configuration and therefore has a fixed cycle time setting. Inside each function block, FIG. 2 shows the values of two variables, CT (Cycle Time) and EO (Execution Order). Inside function blocks, also variable EO(20) is shown. EO(20) denotes the execution order within a group of function blocks that have a cycle time of 20 ms.

As to cycle times, it can be seen that a cycle time of 20 ms of the fixed function block 220 has also been set for blocks 202 and 240 which feed input data for the fixed block 220. The cycle time settings of blocks 210 and 230 are not dependent on the cycle time setting of the fixed block and may be 30 ms and 40 ms, for example, respectively.

When defining the execution order of the blocks, the input blocks of a fixed block are to be executed before the fixed block. Therefore, blocks 202 and 240 have respective execution orders 20 and 21 and are executed before function block 220 having an execution order 22. The function blocks connected to outputs of the fixed function block may be executed after the execution of the fixed block.

When further considering the configuration of FIG. 2, some of the blocks have mutually different cycle times. In the exemplary configuration, three blocks have a cycle time of 20 ms, one block has a cycle time of 30 ms and one block has a cycle time of 40 ms. From a processor point of view, a common time denominator is found for these blocks. This means that the smallest such execution cycle is found such that each of the blocks of the configuration may be run. In this case, each of the values 20, 30, 40 ms may be divided with 10 and the result is still an integer. Therefore, it may determined that the execution time of the processor running the configuration of FIG. 2 should be 10 ms.

When the time calculation starts from 0 ms, the first execution time is at 10 ms. In the present example, no function block needs to be executed at 10 ms. The next execution time is at 10 ms+10 ms or at 20 ms when the blocks FB1, FB3 and FB5 are to be executed. In the exemplary method, the sub execution order for blocks, which have a parameter EO(20) other than 0 (zero), is read. These blocks are executed in the execution order 1(FB1)-2(FB5)-3(FB3), which order can be derived from the main execution order shown by the parameter EO. That is, the smallest EO value gives also the smallest EO(20) value. At 30 ms, only block FB2 is to be executed. At 40 ms, a new sub execution order is defined. Due to the main execution order defined by the EO parameter, the sub execution order EO(40) will be FB1-FB5-FB3-FB4.

The process continues in a similar manner. At 50 ms, there are no blocks to execute and at 60 ms, the execution order will be FB1-FB5-FB3-FB2.

Figure 3:
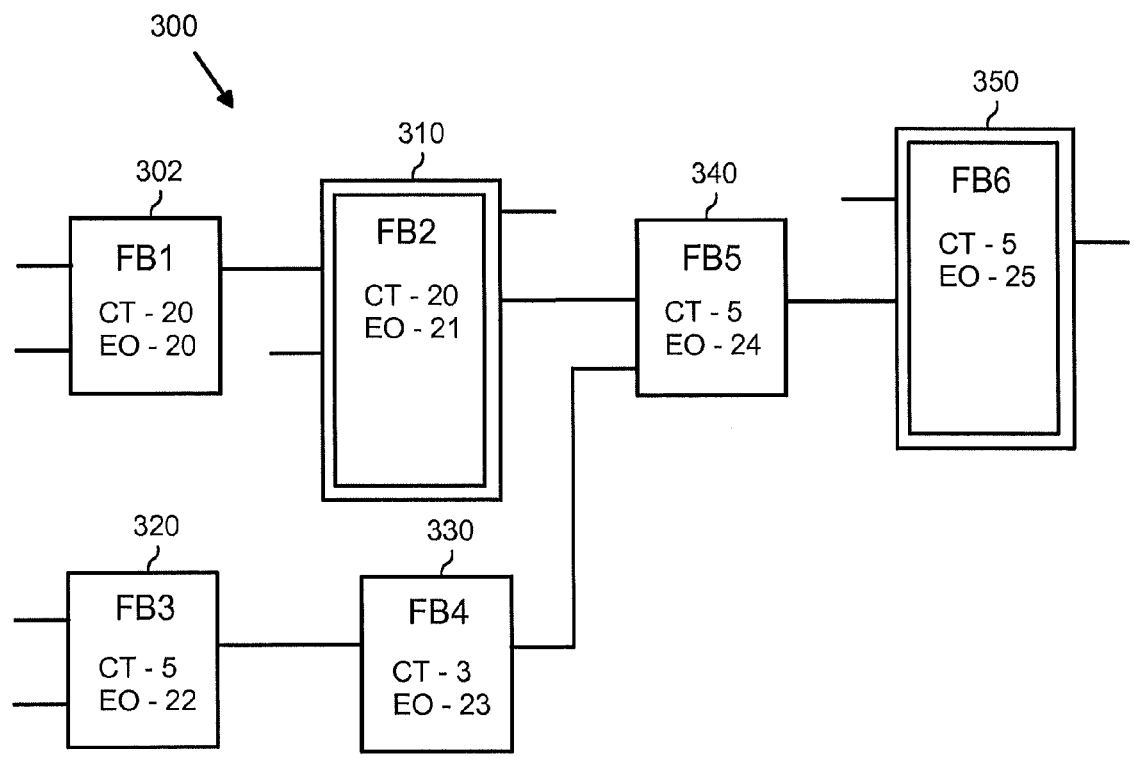
FIG. 3 shows another exemplary embodiment of a configuration according to the present disclosure.

FIG. 3 shows another exemplary embodiment of a configuration. Of the six function blocks FB1 to FB6, function blocks FB2 310 and FB6 350 are fixed function blocks highlighted by double frames around the blocks. As shown in FIG. 3, function block FB2 has a cycle time of 20 ms, and function block FB6 has a cycle time of 5 ms. Of these two fixed function blocks, block FB2 is connected to FB6 indirectly. From among the two fixed blocks, FB6 is the farthest from the input of device, whereby setting of the cycle times starts from block FB6.

FIG. 3 shows that block FB1 feeding the fixed block FB2 with input data has been assigned the same cycle time value of 20 ms as the fixed block FB2. The execution order of these blocks is such that the block feeding a subsequent block is executed first and, therefore, the execution order of these blocks is FB1-FB2.

The configuration of the cycle times and execution order continues from the next fixed block, i.e. block FB6. FIG. 3 shows a chain of function blocks FB3-FB4-FB5, which precede function block FB6, and the last function block FB5 before block FB6 finally provides the input value for block FB6. As can be seen from FIG. 3, the cycle time of block FB5 has been set to be the same as the cycle time of block FB6. This may be continued along the chain as shown in FIG. 3, where block FB3 has also been assigned the same cycle time value of 5 ms. With regard to block FB4, it may be assumed that a cycle time value 5 ms is not allowable for this block and therefore the next allowable smaller value of 3 ms and is chosen for the block.

From the processor point of view, the smallest common divisor is to be found for the cycle times present in the configuration. In this case, the smallest denominator is 1 ms, meaning that the processor should run an execution cycle each millisecond.

Following the procedure explained above in conjunction with FIG. 2, at 15 ms, for example, the sub execution order of the blocks is FB3-FB4-FB5-FB6, because 15 ms may be divided with the cycle times of these blocks resulting into an integer. At 20 ms, for example, the execution order will be FB1-FB2-FB3-FB5-FB6. The cycle time 3 ms of function block FB4 does not divide 20 ms resulting into an integer and FB4 is thus not executed at 20 ms but is alone from the shown function blocks to be executed at 21 ms, for example.

Figure 4:
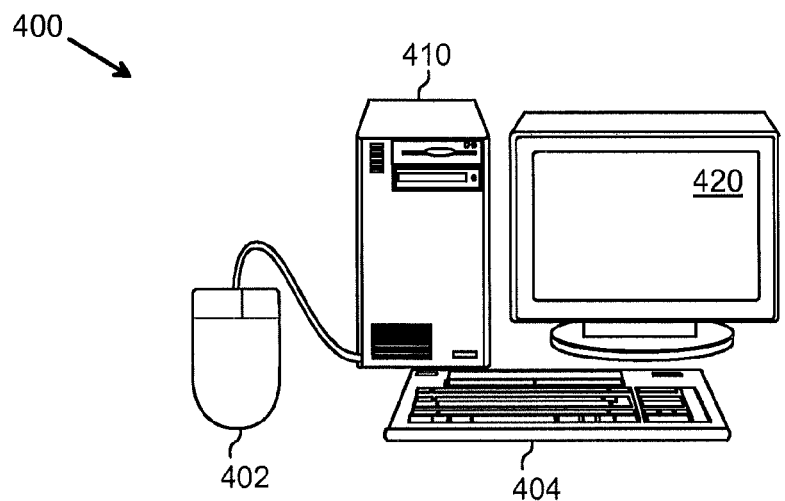
FIG. 4 shows an exemplary embodiment of an apparatus according to the present disclosure.

FIG. 4 shows an exemplary embodiment of an apparatus that may be used in configuring an intelligent electronic device. The apparatus may be a workstation 400 including a mouse 402 and a keyboard 404. A user making the configuration may use the mouse and the keyboard together with the display as a user interface of a configuration tool to add/delete function blocks to/from a configuration. The user may establish connections between the blocks by drawing connecting lines between the function blocks and/or to/from external variables.

The workstation 400 may operate in isolation or it may be connected via a communication network to other workstations and/or a server computer.

A display 420 shows visually the function blocks and the connections relating to the function blocks. By means of the components of the user interface, the user may open a configuration, which may be a blank or some default configuration. After opening the configuration, the user may start creating and/or amending an existing configuration. In this work, the user may add new function blocks or delete function blocks existing in the configuration. The user may also change the positions of the function blocks in the configuration and define the connecting lines between the function blocks. The inputs/outputs of the function blocks may also be connected to external variables or to a physical inputs/outputs of the device.

When the configuration has been completed, it may be compiled. A compilation result may be obtained listing possible errors in the configuration.

A central unit 410 of the workstation 400 may include a software package suitable for use in the configuration of the intelligent electronic device. The software package may co-operate with the mouse 402 and the keyboard 404 in taking inputs from the user. The software may also instruct the display 420 in displaying the status of the current configuration work. A processor of the central unit 410 can execute the software.

Figure 5:
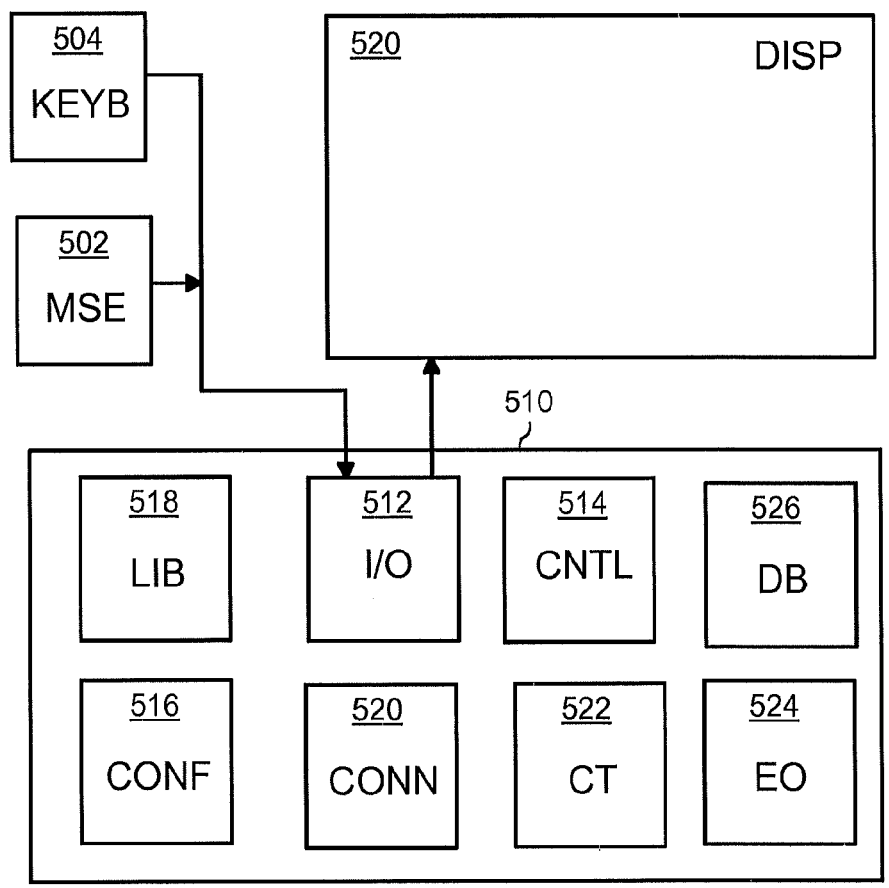
FIG. 5 shows another exemplary embodiment of an apparatus according to the present disclosure.

FIG. 5 shows another exemplary embodiment of an apparatus for performing the configuration. As in FIG. 4, by using a mouse 502 and a keyboard 504, a user is able to feed input information for making the configuration of the intelligent electronic device. Instead of or in addition to mouse/keyboard, other known input methods, such as touching and/or speech, may be applied as well.

A central unit 510 may include an input/output unit 512, which may handle external interfaces of the central unit. Via the input/output unit, the central unit may receive input data from the input devices, such as the keyboard 504 and the mouse 502, and may output data to a display 520. In FIG. 5, the central unit 510 has been shown to include a plurality of subunits. For the sake of simplicity, connections between the subunits of the central unit 510 have been omitted in FIG. 5. However, it will be appreciated that the subunits can be connected to one another, such as by a common bus, for example.

The central unit 510 may include a configuration unit 516, which may be responsible for opening a new configuration and adding/deleting function blocks to/from the configuration. A library 518 including a selection of predefined configurations and function blocks available for selection by the configuration unit may also be provided. The configuration unit 516 may also be responsible for providing a listing of all devices in a larger configuration and illustrating the relations and hierarchy of the devices. According to an exemplary embodiment, the configuration unit 516, in possible concert with the library 518, may constitute a means for providing a group of function blocks defining at least a part of a configuration of an intelligent electronic device.

A connection unit 520 may also be provided. The connection unit 520 may be responsible for providing the functions needed in making the connections for the function blocks. The function blocks may be connected with each other, or they may receive an input variable, or they may output an output variable. According to an exemplary embodiment, the connection unit 520 may constitute a means for defining connection lines between the function blocks.

A cycle time defining unit 522 may also be provided. The definition of cycle times may be coupled to a push button or a menu selection in the user interface. When the user has added the function blocks and connected their inputs and outputs, the user may press a push button, for example, and the cycle time definition unit defines the cycle times for the blocks automatically. At first, the defining unit 522 locates a function block with a fixed cycle time setting and reads the cycle time value of the fixed function block. Then, the defining unit 522 may set one or more preceding/following blocks to have the same cycle time value as the fixed function block has. If a chain of function blocks precedes a fixed function block, each of these may be set to have the cycle time value of the fixed block. If these function blocks preceding the fixed function block do no allow use of the same value as the fixed block has, a next smaller value is selected for the block to ensure provision of fresh data for the fixed block.

The apparatus may also include an execution order definition unit 524. Similarl to the definition of the cycle time, an activation tool, such as a push button or menu selection, may be provided in the user interface. Upon activation of this activation tool, the unit 524 may define the execution order of the function blocks. In this definition, the unit may locate a fixed function block. Then, the blocks feeding the fixed block with input data are to be executed before the fixed block. Consequently, the blocks connected to the outputs of the fixed block are executed after the execution of the fixed block. The execution order may be determined recursively backwards until a physical input is met. Thus, a function block that is connected to a physical input of the device, may get the smallest execution number, the execution numbers may increase to the right and/or down in the configuration. If two blocks feed a subsequent block, the execution order of these may be determined randomly. According to an exemplary embodiment, the defining unit 522 and/or definition unit 524 may constitute a means for locating, in a group of function blocks, a fixed function block having a fixed cycle time value. In addition, according to an exemplary embodiment, the definition unit 524 may constitute a means for defining configuration settings of the configuration by setting a configuration setting for a function block connected to the fixed function block.

Alternatively to an activator in the user interface, such as a push button or a menu selection, the cycle times and execution orders may be generated automatically when the user tries to upload the configuration to an IED.

The central unit may also include a database, which may co-operate with the other subunits. The database may store the current status of the configuration including the function blocks used and the connection there between, for example. The database may also store the cycle time values of the function blocks, and also provide a parameter for each function block indicating whether or not a cycle time value is fixed.

The database may also store the execution orders for each execution time. For example, if the processor runs an execution cycle each 5 ms, the execution times are 5 ms, 10 ms, 15 ms, and so on. For each of these execution times, a sub execution order may be stored into the database. That is, only a subset of all function blocks may be executed at each execution time and the execution order of this subset is stored in the database. When all the different sub execution orders have been found, it may be concluded that the execution orders starts repeating itself and they need no more be stored separately in the database. For example, if the four first execution times (10 ms, 20 ms, 30 ms, 40 ms) differ from each other but it can be noticed that the fifth sub execution order is the same as the first one, and the sixth is the same as the second one, the database needs only to store the four different execution orders. At the fifth execution time, the first execution order is read from the database and so on.

The disclosure may be implemented by software or hardware components implementing the functionality of exemplary embodiments of the present disclosure. A combination of software and hardware implementation is also possible.

It will be appreciated that as technology advances, the inventive concept can be implemented in various ways. The disclosure and its embodiments are not limited to the examples described above but may vary within the scope of the claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A configuration arrangement comprising:
   means for providing a group of function blocks defining at least a part of a configuration of an intelligent electronic device, wherein each function block is for executing a function in the intelligent electronic device;
   means for defining connection lines between the function blocks;
   means for locating, in the group of function blocks, a fixed function block having a fixed cycle time value; and
   means for defining configuration settings of the configuration by setting a configuration setting for a function block connected to the fixed function block, wherein:
   the defining means is comprised in a processor of a computer processing device;
   the defining means is configured to set a cycle time of the function block connected to an input of the fixed function block to a cycle time value which is the same as or smaller than the cycle time value of the fixed function block; and
   the defining means is configured to set an execution order of the function blocks of the configuration such that a function block connected to an input of the fixed function block is executed before the fixed function block.

2. A configuration arrangement according to claim 1, wherein the defining means is configured to set, for each function block in a chain of function blocks preceding a fixed block until another fixed function block or a physical input of the electronic device, a cycle time value from a set of allowable cycle time values of each function block which is smaller than or equal to the cycle time value of the fixed block.

3. A configuration arrangement according to claim 1, comprising:
   means for identifying a loop in the configuration; and
   means for setting for each function block in the loop a cycle time value from a set of allowable cycle time values of the function block which is smaller than or equal to the cycle time value of the fixed block.

4. A configuration arrangement according to claim 3, comprising:
   means for starting the configuration setting, if more than one loop exists in the configuration, from a loop having a function block connected to a physical input of the intelligent electronic device if such a loop is available.

5. A configuration arrangement according to claim 1, wherein
   the defining means is configured to set a configuration setting first for a function block connected to the fixed function block furthest away when measured as the number of connections from a physical input of the intelligent electronic device if more than one fixed block exists in the configuration.

6. A configuration arrangement according to claim 1, wherein the defining means is configured to set an execution order of function blocks such that a function block connected to a physical input of the device has the smallest execution number and a function block connected to an input of a function block has a smaller execution number than the function block connected to the fixed function block of the configuration to be executed.

7. A configuration arrangement according to claim 6, wherein the defining means is configured to set a sub execution order based on the execution order of function blocks of the configuration to be executed at a certain execution time.

8. A configuration arrangement according to claim 7, wherein the defining means is configured to store all different sub execution orders of different execution times and apply the relevant execution order at the relevant execution time.

9. A configuration arrangement according to claim 1, wherein the defining means is configured to set an execution order of the function blocks of the configuration such that a function block connected to an output of the fixed function block is executed after the fixed function block.

10. A configuration arrangement according to claim 1, wherein the defining means is configured to define an execution order of the function blocks of the configuration such that the one or more function blocks connected to the fixed function block closest to a physical input of the intelligent electronic device are executed before the function blocks connected to other fixed blocks.

11. A method comprising:
    providing a group of function blocks defining at least a part of a configuration of an intelligent electronic device, wherein each function block is for executing a function in the intelligent electronic device;
    defining connection lines between the function blocks;
    locating, in the group of function blocks, a fixed function block having a fixed cycle time value; and
    defining, in a processor of a computer processing device, configuration settings of the configuration by setting a configuration setting for a function block connected to the fixed function block, wherein:
    the defining of the configuration settings comprises setting a cycle time of the function block connected to an input of the fixed function block to a cycle time value which is the same as or smaller than the cycle time value of the fixed function block; and
    the defining of the configuration settings comprises setting an execution order of the function blocks of the configuration such that a function block connected to an input of the fixed function block is executed before the fixed function block.

12. A method according to claim 11, wherein in defining the configuration settings, the method comprises setting for each function block in a chain of function blocks preceding the fixed function block until another fixed function block or a physical input of the electronic device, a cycle time value from a set of allowable cycle time values of each function block which is smaller than or equal to the cycle time value of the fixed function block.

13. A method according to claim 11, comprising:
identifying a loop in the configuration; and
setting for each function block in the loop a cycle time value from a set of allowable cycle time values of the function block which is smaller than or equal to the cycle time value of the fixed block.

14. A method according to claim 13, comprising:
starting the configuration setting, if more than one loop exists in the configuration, from a loop having a function block connected to a physical input of the intelligent electronic device if such a loop is available.

15. A method according to claim 11, comprising:
defining first a configuration setting for a function block connected to the fixed function block furthest away when measured as number of connections from a physical input of the intelligent electronic device if more than one fixed function block exists in the configuration.

16. A method according to claim 11, wherein an execution order of function blocks is set such that a function block connected to a physical input of the device has the smallest execution number and a function block connected to an input of a function block has a smaller execution number than the function block connected to the fixed function block of the configuration to be executed.

17. A method according to claim 16, wherein a sub execution order is defined based on the execution order of function blocks of the configuration to be executed at a certain execution time.

18. A method according to claim 17, wherein all different sub execution orders of different execution times are stored and applied at the relevant execution time.

19. A method according to claim 11, wherein in defining the configuration settings, the method comprises setting an execution order of the function blocks of the configuration such that a function block connected to an output of the fixed function block is executed after the fixed function block.

20. A method according to claim 11, wherein in defining the configuration settings, the method comprises defining an execution order of the function blocks of the configuration such that the one or more function blocks connected to the fixed function block closest to a physical input of the intelligent electronic device are executed before the function blocks connected to other fixed blocks.

* * * * *